United States Patent Office 3,739,049
Patented June 12, 1973

3,739,049
METHOD FOR PRODUCING POWDER COMPOSED OF PRECISELY SPHERICAL PARTICLES
Kazuo Honjo, Nishinomiya, Japan, assignor to Ideki Co., Ltd., Tokyo, Japan
Filed Dec. 4, 1970, Ser. No. 95,403
Int. Cl. B01j 2/06
U.S. Cl. 264—14      1 Claim

ABSTRACT OF THE DISCLOSURE

Method for producing a synthetic resin powder composed of precisely spherical particles wherein a solution is prepared by dissolving a synthetic resin in a solvent, spraying the solution in the presence of a separation agent, removing the separation agent from the sprayed material after recovery, and drying the resultant product.

BACKGROUND OF THE INVENTION

The present invention relates to a method for producing a powder composed of precisely spherical particles more particularly to a method for producing a synthetic resin powder composed of precisely spherical particles to be used, for instance, for powder coating.

In recent years, the powder coating method of applying a synthetic resin in the form of powder to a surface to be coated has come into extensive use because of its outstanding advantages. Presently, synthetic resin powder to be used for powder coating is produced either by a chemical method in which powder is obtained by polymerization or by a mechanical method wherein a resin in the form of pellets or in some other solid form is pulversized. However, the former is not a method which is practiced exclusively for use with powder coating, but part of the amount of powder thereby produced is merely utilized for powder coating, so that a powder of an optimum particle size cannot be obtained. The former method therefore has inevitable disadvantages of high cost and difficulty to obtain particles in the form of true spheres. On the other hand, the latter has other disadvantages that particles produced are irregular in shape, some being fluffy or threadlike, and that the particle size varies over a wide range of distribution. In order to insure high fluidity of the powder for powder coating so as to obtain a uniformly smooth surface, it is necessary to use a synthetic resin powder composed of precisely spherical particles which are uniform in particle size.

SUMMARY OF THE INVENTION

The present invention provides a method for producing a particulate synthetic resin in the form of true spheres which meets the foregoing requirements and generally comprises the steps of preparing a solution by dissolving a synthetic resin in a solvent, spraying the solution in the presence of a separation agent, removing the separation agent from the sprayed material after recovery, and drying the resultant substance.

In accordance with the method of this invention, powder of a desired particle size can be obtained by varying the foregoing production conditions. Because of the spraying operation, exactly spherical particles of the same size can be obtained efficiently. In the case where metal powder such as aluminum, brass, stainless steel or the like, ceramic material or sand is added to the liquid material, particles of such material will be put together and coated with synthetic resin, with the result that they look beautiful because they can be seen through the coating. The synthetic resin powder obtained by the method of this invention insures smooth surface free of irregularity when used for powder coating.

The present invention will be described in greater detail with reference to the accompanying drawings.

DESCRIPTION OF THE PREFERRED EMBODIMENTS

Figure 1:
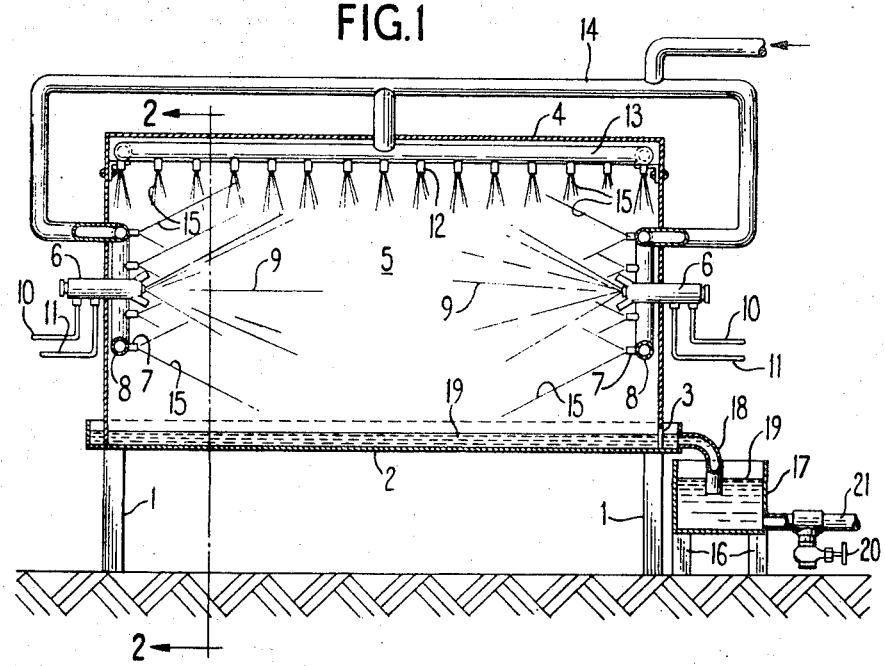
FIG. 1 is a front view in vertical section showing an apparatus for producing a synthetic resin powder composed of precisely spherical particles in accordance with the method of this invention.
Figure 2:
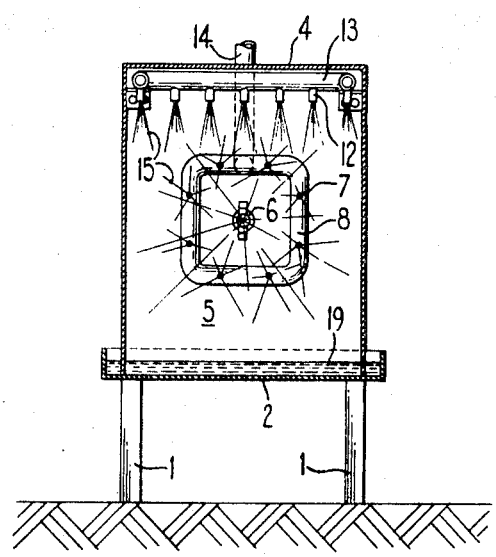
FIG. 2 is a side elevation in section taken along the line 2—2 in FIG. 1.

Referring to FIG. 1, there is shown a shallow tank 2 which has legs 1. Mounted on the tank 2 is a tank 4 which is in the form of an inverted U-shape in section and slightly smaller than the tank 2 in size, the tank 4 being provided with an opening 3. Thus, a chamber 5 is formed. Disposed inside the tank 4 at the center of the opposite side walls thereof are sets of annular sprayers 8 for a separation agent and sprayers 6 for a solution 9 disposed at the center of the annular sprayers 8, each of the sprayers 8 being provided with several nozzles 7. In order to eject the solution 9 from the sprayer 6 under pneumatic pressure, the sprayer 6 is provided with a feed pipe 10 for the solution and another feed pipe 11 for compressed air. On the inside of the upper wall of the tank 4, there is a dispersing pipe 13 for a separation agent which extends along the whole side wall, i.e., along the inside upper end of the peripheral wall of the tank 4. The pipe 13 has a plurality of nozzles 12. The sprayer 8 and the dispersing pipe 13 communicate with the same feed pipe 14 for supplying the separation agent, so that the same separation agent 15 is discharged from the sprayer 8 and the pipe 13 under hydraulic pressure.

A tank 17 provided with short legs 16 is positioned beside and below the tank 2, and an outlet pipe 18 extends from the side wall of the tank 2 downward into the tank 17 so as to flow a mixture 19 of powder and the separation agent, received by the tank 2, into the tank 17. Fixed to the tank 17 at its side wall is a drain pipe 21 carrying a cock 20.

The solution 9 is obtained by dissolving a synthetic resin in a solvent. When desired, a pigment may be added to the solution. Where necessary, a plasticizer or a blowing agent may further be added. Any synthetic resin is applicable insofar as the resin can be dissolved in a solvent with or without heating. For instance, conveniently employable are epoxy resin, acrylic resin, alkyd resin, cellulose derivatives, polyvinyl acetal, and copolymer of vinyl chloride and vinyl acetate, since these are soluble in a solvent without heating. Further, polyethylene, nylon and vinyl chloride which are readily soluble in a solvent by heating may also be used.

Through the feed pipes 10, the solution is sent to the sprayers 6, from which it is sprayed into the chamber 5 under the pressure of the air supplied by the feed pipes 11. Since the solution 9 is ejected from the sprayers 6, it is required that the viscosity of the solution be adjusted to 60 to 200 centistokes. The pressure of the compressed air may be adjusted to more than 4 kg./cm.$^2$ so that the solution 9 may be dispersed in the form of spray when discharged from the sprayers 6.

When the solution is ejected into the chamber 5, the separation agent 15 is sprayed from the sprayers 8 and the dispersing pipe 13 simultaneously therewith. Employable as the separation agent 15 are water, preferably deionized water, hot water having a temperature of about 160° F., petroleum, solvent naphtha, mineral turpentine. Economically, however, water is the most preferable.

The solution 9 ejected from the sprayer 6 is dispersed in the form of spray, i.e., in the form of true sphere or particles resembling true sphere. The solvent is volatilized before the powder falls into the tank 2. Even if the solution 9 is reduced to powder upon spraying, the resultant minute particles tend to get together while falling downward, but the separation agent 15 discharged from the nozzles 7 of the sprayers 8 serves to prevent such tendency. Thus, the separation agent 15 keeps contact with the atomized solution 9. Since the spraying pressure of the solution 9 is greater than that of the separation agent 15, the latter is attracted to the former, thus serving to separate the respective particles of the powder which are still sticky while they drop into the tank 2 in which a small amount of separation agent is placed in advance.

On the other hand, the separation agent 15 sprayed from the annular dispersing pipe 13 and flows down continuously along the inner face of peripheral wall of the tank 4 so that the splashed powder which is still sticky is prevented from sticking to the inner face of the tank 4.

The mixture 19 of powder and separation agent received by the tank 2 is led into the tank 17 through the outlet pipe 18 and, when a predetermined amount is recovered, the cock 20 is opened to transfer the mixture to a centrifugal separator (not shown) by way of the drain pipe 21. After the separation agent has been removed by the centrifugal separator, the resultant substance is dried and a finished product of powder comprising precisely spherical particles is obtained. The particle size of the powder is 0.3 to 200$\mu$. If it is desired to reduce the particle size, the viscosity of the liquid material 9 may be lowered, or spraying pressure may be reduced.

Although the drawing shows sets of the sprayer 6 for solution and sprayers 8 for separation agent are fixed to the opposite side walls of the tank 4 in facing relationship, the number of the set may be varied as desired. While the separation agent 15 is so sprayed as to center around the spray of solution 9, the separation agent 15 may be ejected in such direction as to intersect the spray of solution 9 at right angles or at some other angle. The same powder as above will be obtained, if the tank 2 is sufficiently filled with the separation agent 15 in advance and the nozzles of the sprayer for solution are put into the separation agent 15 to eject the solution therein. In this case, the sprayer for the separation agent will of course be dispensed with. However, the ejection pressure of the solution sprayer should be greater than is the case with ejection in the air, the requisite pressure being 6.5 kg./cm.$^2$. Further, in the simplest mode of operation, the feed pipe 11 for compressed air may be used as the pipe for feeding the separation agent, into which steam may be supplied. In accordance with this method, the solution is sprayed under the steam pressure, while the steam serves to effect separation. Provision of a heater on the feed pipe 10 for the solution at the intermediate position thereof facilitates flow of the solution 9 for easier spraying operation.

EXAMPLE 1

A solution formed by dissolving a synthetic resin in a volatile solvent was prepared by dissolving 1000 g. of 6, 10 nylon in 15 kg. of phenol. 200 liters of deionized water serving as a separation agent and containing 80 g. of an addition product of nonylphenol ethylene oxide, a nonionic activator, was prepared separately. Employing the illustrated apparatus, the solution was sprayed in the presence of the separation agent, and after recovery the separation agent was removed from the sprayed substance. By drying the resultant product, 985 g. of a powder material to be used as an additive for face powder and composed of precisely spherical particles 5 to 43$\mu$ in size was obtained.

EXAMPLE 2

A solution formed by dissolving synthetic resin in a volatile organic liquid solvent was prepared by mixing together at room temperature 100 g. of epoxy resin, 50 g. of titanium white, serving as coloring agent, 8 g. of dicyandiamide, hardener, and 150 g. of methyl ethyl ketone, solvent. 2 liters of solvent naphtha was prepared as a separation agent. Employing an apparatus as illustrated, the solution was sprayed in the presence of the separation agent, and after recovery the separation agent was removed from the sprayed substance. By drying the resultant product, 160 g. of a powder material composed of precisely spherical particles 10 to 105$\mu$ in size was obtained.

EXAMPLE 3

A similar solution was prepared by emulsifying 100 g. of epoxy resin, 10 g. of polyamide and 260 g. of tetrahydrofuran in 3 liters of deionized water containing an addition product of nonylphenol ethylene oxide. 2 liters of deionized water was separately prepared as a separation agent. The solution was sprayed in the presence of the separation agent by an apparatus as illustrated and, after recovery, the separation agent was removed from the sprayed substance. By drying the resultant product, 105 g. of a powder material composed of precisely spherical particles 0.5 to 3$\mu$ in size was obtained.

I claim:
1. A method for producing a powder of spherical particles of a synthetic resin, comprising:
    (a) dissolving a synthetic resin in a volatile organic solvent to form a solution having a viscosity of about 60–200 centistokes,
    (b) directing a spray of said solution under a pressure of 6.5 kg./sq. cm. into a chamber to form spherical particles thereof,
    (c) directing into said chamber a spray of a liquid as a separation agent and intersecting said spray of solution, said resin being insoluble in said liquid separation agent, and the spraying force of said liquid separation agent being less than that of said sprayed solution,
    (d) volatilizing the solvent from the particles of said sprayed solution to form spherical particles of resin powder falling in said chamber, said particles of liquid separation agent serving to separate said powder particles rendered sticky by said volatilization, and
    (e) collecting said spherical powder particles in a tank containing said separation agent liquid, from which said powder particles are recovered and dried.

References Cited

UNITED STATES PATENTS

| | | | |
|---|---|---|---|
| 2,797,201 | 6/1957 | Veatch et al. | 264—13 |
| 3,561,003 | 2/1971 | Lanham et al. | 264—13 |
| 3,446,877 | 5/1969 | Endler | 264—14 |

OTHER REFERENCES

Perry's Chemical Engineers' Handbook, 4th ed., 1963, pp. 20-57—20-58.

ROBERT F. WHITE, Primary Examiner

J. R. HALL, Assistant Examiner

U.S. Cl. X.R.

264—13